(12) United States Patent
Friedrich et al.

(10) Patent No.: US 9,206,845 B2
(45) Date of Patent: Dec. 8, 2015

(54) ROLLING BEARING

(75) Inventors: Peter Friedrich, Auernheim (DE);
Michael Krüger, Schweinfurt (DE);
Steffen Säbsch, Weisendorf (DE); Heinz Schäfers, Erlangen (DE); Matthias Fick, Schnaittach (DE); Manfred Winkler, Aurachtal (DE); Johannes Enders, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 13/993,938

(22) PCT Filed: Nov. 30, 2011

(86) PCT No.: PCT/EP2011/071332
§ 371 (c)(1),
(2), (4) Date: Jun. 13, 2013

(87) PCT Pub. No.: WO2012/100867
PCT Pub. Date: Aug. 2, 2012

(65) Prior Publication Data
US 2013/0266251 A1 Oct. 10, 2013

(30) Foreign Application Priority Data
Jan. 26, 2011 (DE) .................. 10 2011 003 211

(51) Int. Cl.
*F16C 19/00* (2006.01)
*F16C 33/46* (2006.01)
(Continued)

(52) U.S. Cl.
CPC .............. *F16C 33/467* (2013.01); *B21D 53/12* (2013.01); *F16C 33/4623* (2013.01);
(Continued)

(58) Field of Classification Search
CPC ............. F16C 33/4617; F16C 33/4623; F16C 33/4629; F16C 33/4635; F16C 33/467; F16C 33/6614; F16C 33/6629; F16C 33/6651; F16C 33/6681; F16C 33/3887; B21D 53/12; Y10T 29/49643
USPC ......................... 384/470, 572, 575, 576, 623; 29/898.065, 898.067
See application file for complete search history.

(56) References Cited

U.S. PATENT DOCUMENTS 1,943,894 A  *  1/1934  Johnson ..................... 384/575
2,933,803 A  *  4/1960  Schaeffler ............... 29/898.067
(Continued)

FOREIGN PATENT DOCUMENTS

DE    1 530 909 A1    7/1969
DE    2447908 A1    4/1975
(Continued)

OTHER PUBLICATIONS

CN Application No. 201180066159.8—Office Action dated Feb. 4, 2015.

*Primary Examiner* — James Pilkington
(74) *Attorney, Agent, or Firm* — Fitzpatrick, Cella, Harper & Scinto

(57) ABSTRACT

A rolling bearing comprising a rolling bearing cage having a plurality of rolling element pockets arranged in at least one row to receive at least one row of rolling elements, two lateral rings and a plurality of crosspieces connecting the two lateral rings, such that the plurality of rolling element pockets are formed between the plurality of crosspieces, and at least one empty pocket. The rolling bearing cage includes fewer rolling elements in the at least one row than the number of rolling element pockets, such that the at least one empty pocket does not receive a rolling element. A method for producing a rolling bearing cage is also provided.

11 Claims, 1 Drawing Sheet

(51) Int. Cl.
   F16C 33/66 (2006.01)
   B21D 53/12 (2006.01)
   *F16C 19/46* (2006.01)

(52) U.S. Cl.
   CPC ........ *F16C 33/4676* (2013.01); *F16C 33/6681* (2013.01); *F16C 19/463* (2013.01); *F16C 2220/66* (2013.01); *F16C 2361/61* (2013.01); *Y10T 29/49643* (2015.01)

(56) References Cited

U.S. PATENT DOCUMENTS

| | | | | |
|---|---|---|---|---|
| 3,588,207 A | * | 6/1971 | Greby | 384/533 |
| 3,963,285 A | | 6/1976 | Kellstrom | 308/202 |
| 5,630,670 A | | 5/1997 | Griffin et al. | 384/606 |
| 6,003,430 A | | 12/1999 | Lang | 92/12.1 |
| 6,461,049 B2 | | 10/2002 | Straub et al. | 384/470 |
| 2010/0310203 A1 | * | 12/2010 | Fandre et al. | 384/572 |

FOREIGN PATENT DOCUMENTS

| | | | |
|---|---|---|---|
| DE | 197 11 557 A1 | 9/1998 | |
| DE | 199 59 498 | 6/2001 | |
| DE | 10 2005 027 186 A1 | 12/2006 | |
| GB | 1163943 A | 9/1969 | F16C 19/30 |
| NL | 121365 | 10/1966 | |

* cited by examiner

ROLLING BEARING

FIELD OF THE INVENTION

The present invention concerns a rolling bearing with a rolling bearing cage having a plurality of rolling element pockets arranged in at least one row to receive at least one row of rolling elements, wherein the rolling bearing cage consists of two lateral rings and a plurality of crosspieces connecting them, between which crosspieces are formed the rolling element pockets, and having at least one empty pocket. In addition, the invention concerns a method for producing such a rolling bearing cage.

BACKGROUND OF THE INVENTION

A cage of this nature for a rolling bearing is described in DE 10 2005 027,186 A1. The rolling bearing cage consists of a cylindrical base body on which is formed at least one row of rolling element pockets spaced apart from one another in the circumferential direction to receive rolling elements, and on which is formed a row of empty pockets arranged axially adjacent thereto, for example to receive lubricant.

It is a disadvantage that this prior art rolling bearing cage is wider in design than a conventional single-row or double-row rolling bearing cage if the customary length of the rolling elements is maintained, or that the length of the rolling elements must be reduced to compensate for the additional axial space required for the empty pockets. Consequently, the manufacturing cost for this prior art rolling bearing cage is higher since the material requirement is increased, additional processing expenditure is needed for the empty pockets, and the load rating of the rolling bearing equipped with this rolling bearing cage is reduced with the shortened rolling elements.

OBJECT OF THE INVENTION

Against this background, the object of the invention is to propose a rolling bearing having a rolling bearing cage that is easy to manufacture, does not require higher material costs than a conventional rolling bearing cage, is unchanged in its dimensions as compared to a conventional rolling bearing cage, and accordingly has practically the same properties and also permits targeted lubricant feed. In addition, the invention has the object of specifying a method for producing such a rolling bearing cage.

SUMMARY OF THE INVENTION

In order to attain this object, the invention starts from a rolling bearing with a rolling bearing cage that has a plurality of rolling element pockets arranged in at least one row to receive at least one row of rolling elements, wherein the rolling bearing cage consists of two lateral rings and a plurality of crosspieces connecting them, between which crosspieces are formed the rolling element pockets, wherein the rolling element cage has at least one empty pocket. According to the invention, provision is made for the rolling bearing cage to be equipped with fewer rolling elements in one row than corresponds to the number of rolling element pockets, causing the rolling bearing cage to have at least one empty pocket without a rolling element in the at least one row of rolling element pockets.

The rolling bearing cage can be produced in the same manner as a rolling bearing cage whose rolling element pockets are all equipped with rolling elements, except that at least one rolling element pocket is not equipped with a rolling element, thus resulting in an empty pocket. This empty pocket serves to receive and/or distribute lubricant.

It is likewise possible to form multiple empty pockets by omitting rolling elements, wherein the maximum number of empty pockets preferably is limited to the extent that only every second rolling element pocket is equipped with a rolling element.

In order to create a targeted conveying or pumping action of the empty pockets of the cage in at least one direction of rotation thereof, in accordance with a further development of the invention the empty pockets can have a different shape than the rolling element pockets. In principle, the empty pockets can have any desired geometry, for example angled, conical, spherical, nonuniform, asymmetrical, smaller or larger than the rolling element pockets. Their specific geometry can be determined solely by the saving in production time and/or their pumping action, wherein reworking of an empty pocket manufactured in a first production step is avoided.

For example, when the rolling element pockets are produced by mechanical processing by the means that the rolling element pockets are first worked into the circumference of the rolling bearing cage at regular intervals using a cylindrical milling cutter, the pockets intended to receive rolling elements can subsequently be provided with undercuts by means of an additional profiled cutter in order to secure the rolling elements from falling out before assembly and guide them precisely in operation. The at least one empty pocket does not have such undercuts, saving production costs.

The rolling bearing cage according to the invention can preferably be produced as one piece from plastic and be designed to receive bearing needles of a needle bearing.

To attain the stated object, moreover, a method for producing a rolling bearing cage of the aforementioned type is proposed, according to which at least the undercuts in the region of the rolling element pockets are produced by means of a profiled cutter. In this case, the rolling element pockets can be pre-machined by means of a cylindrical milling cutter in a first step, and the empty pockets can be finish processed by means of the same cylindrical milling cutter.

Complete mechanical processing of the rolling element pockets and the empty pockets by means of milling cutters is preferably employed when the rolling bearing cage is solidly constructed of metal, for example brass.

When the rolling bearing cage is made of plastic, it is possible to form the rolling element pockets and the empty pockets by means of slides arranged in the injection molding tool. Since the injection molding tool is very complex and cost-intensive as a result, this method of production is only advantageous for very large quantities.

When the rolling element pockets are worked in radially by means of the cylindrical milling cutter and the empty pockets are worked into the cage blank by means of the same milling cutter with an offset, empty pockets are obtained whose walls and center line form an angle in the circumferential direction with a radius extending from the longitudinal axis of the cage. In this way, a pumping action directed radially inward or radially outward as a function of the direction of rotation can be achieved for the lubricant. The center line of an empty pocket is understood to be the axially extending center between the two axially oriented walls of the empty pocket.

The profiled cutter used to produce the undercuts of the rolling element pockets is guided with a radial orientation along the side walls of the rolling element pockets produced by means of the cylindrical milling cutter, wherein it is possible to first produce all pockets in the rolling bearing cage, including the offset empty pockets, by means of the cylindrical milling cutter, and then incorporate the undercuts in the rolling element pockets in the same manner by means of the profiled cutter.

It is also possible to simultaneously produce the rolling element pockets by means of the cylindrical milling cutter and the undercuts by means of the profiled cutter if the milling head is configured to accommodate and drive two parallel cylindrical milling cutters and a radially oriented profiled cutter that is spaced apart therefrom.

BRIEF DESCRIPTION OF THE DRAWINGS

A preferred embodiment of the rolling bearing designed in accordance with the invention is explained in detail below with reference to the attached drawings. Shown are.

DETAILED DESCRIPTION OF THE DRAWINGS

Figure 1:
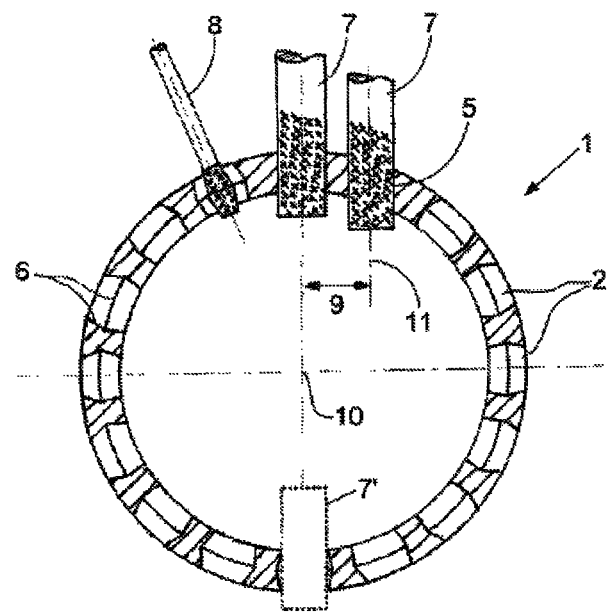
FIG. 1 a radial cross-section through a rolling bearing cage according to the invention with machining tools during its manufacture, and FIG. 2 a top view of the rolling bearing cage according to the invention from FIG. 1 that is intended to accommodate rolling bearing needles.
Figure 2:
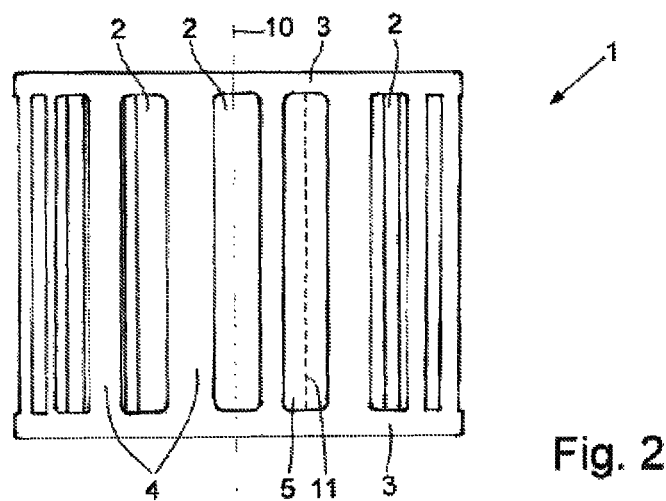

The rolling bearing cage 1 shown in FIGS. 1 and 2 is a solid cage for needle bearings, in particular for an idler bearing in a transmission. The rolling bearing cage 1 can be made of plastic or metal, in particular of brass. The rolling bearing cage 1 has rolling element pockets 2 and at least one empty pocket 5, which pockets are formed between crosspieces 4 that connect two parallel lateral rings 3. The rolling element pockets 2 differ from the empty pockets 5 in that they are provided with undercuts 6 in order to secure the bearing needles, which are not shown, from falling out and to guide them in operation. The undercuts 6 are dimensioned such that the bearing needles can be introduced into the rolling element pockets 2 with light pressure, and are then held therein so they cannot fall out. The rolling bearing cage 1 is shown in single-row form, but it can also be double-row or multi-row in design if the construction circumstances require.

The illustrated exemplary embodiment shows a bearing cage 1 whose rolling element pockets 2 and empty pockets 5 are incorporated in the rolling bearing cage 1 by means of milling. In order to produce the rolling element pockets 2, a cylindrical milling cutter 7 is guided radially against the rolling bearing cage 1 until it has broken through the rolling bearing cage 1, as shown, whereupon the cylindrical milling cutter 7 and/or the rolling bearing cage 1 is moved axially to mill out a rolling element pocket 2 of the required length.

In order to produce an empty pocket 5 with a different cross-section than the rolling element pockets 2, the cylindrical milling cutter 7 or the rolling bearing cage 1 can be moved crosswise to the longitudinal axis of the milling cutter 7 by the offset 9 with respect to the longitudinal axis 10 of the cage, whereupon the empty pocket 5 is produced in the same manner as the aforementioned rolling element pocket 2 using the same cylindrical milling cutter 7. Because of the offset 9, the side walls or center line 11 of the empty pocket 5 extend at an angle to the cage longitudinal axis 10, by which means a targeted conveying or pumping action is achieved for lubricant located in the rolling bearing.

To produce the undercuts 6, a profiled cutter 8 is introduced radially into a prefabricated rolling element pocket 2, as is shown in FIG. 1, then guided against a side wall of the rolling element pocket 2, and then moved axially along this rolling element wall, producing the first undercut 6. At the end of the pre-machined rolling element pocket 2, the profiled cutter 8 is moved axially towards the opposite side wall of the rolling element pocket 2 in the circumferential direction, causing essentially straight end surfaces to be worked into the rolling element pocket 2. Once the second side wall of the rolling element pocket 2 has been reached, the profiled cutter 8 or the rolling bearing cage 1 is moved axially in the opposite direction until the opposite end of the rolling element pocket 2 has been reached. Machining of the end surface takes place as the final machining step, so the shape of the rolling element pockets 2 visible in FIGS. 1 and 2 is achieved.

The illustrated exemplary embodiment shows only one incorporated empty pocket 5, but it is possible to incorporate more than one empty pocket 5 in the rolling bearing cage 1, for example by incorporating in the rolling bearing cage 1 a maximum of one rolling element pocket 2 having undercuts 6 in alternation with each empty pocket 5 having inclined side walls.

In order to achieve streamlined manufacture of the rolling element pockets 2 and the empty pockets 5, two parallel cylindrical milling cutters 7 and one profiled cutter 8 can be arranged in one milling head in the manner shown so that in each case one rolling element pocket 2 is pre-machined by means of the cylindrical milling cutter 7, one empty pocket 5 is final processed, and one pre-machined rolling element pocket 2 is final processed by means of the profiled cutter 8.

Moreover, it is also possible to design the cylindrical milling cutter 7' and the profiled cutter to be long enough that radially opposite rolling element pockets 2 can be milled out in a single pass.

If the rolling bearing cage 1 is designed as a solid plastic cage, the rolling element pockets 2 and the empty pockets 5 can be formed in an injection mold by appropriate slides, which can be moved essentially radially. In order to produce the undercuts 6, however, it must be possible to spread the slides apart in the extended position and to contract them in the circumferential direction for retraction, so that they clear the undercuts 6 and can be withdrawn. Such injection molds equipped with numerous slides are very complex and costly to manufacture, and thus are only suitable for large-scale mass production of such rolling bearing cages 1.

The empty pockets 5, which are not required for the rolling elements, can be produced with side walls that are parallel and inclined at an angle to the longitudinal axis 10 of the cage, as shown in FIG. 1. The empty pocket has straight side walls extending from a radially inner side of the cage to a radially outer side of the cage. The side walls are inclined at an angle relative to a radial axis of the cage, the radial axis extending from the center of the cage through the empty pocket. It is likewise possible to produce the side walls of the rolling element pockets to radially diverge or converge, hence to produce them to be conical or even spherical, asymmetrical, or smaller or larger than the rolling element pockets 2. Measures that simplify production can be utilized in the processing of the empty pockets 5, in particular the tool for processing the empty pockets 5 can be made simpler in design. Depending on the type of this design, it is possible to produce a targeted conveying or pumping action or even to establish a throttling or inhibiting action for the flow of lubricant. These effects may be dependent on the speed and direction of rotation of the rolling bearing.

LIST OF REFERENCE NUMBERS 1 rolling bearing cage
2 rolling element pocket
3 lateral ring
4 crosspiece 5 empty pocket
6 undercut
7, 7' cylindrical milling cutter
8 profiled cutter
9 offset
10 longitudinal axis of cage
11 center line of an empty pocket

The invention claimed is:

1. A rolling bearing with a rolling bearing cage comprising:
   a plurality of rolling element pockets arranged in at least one row and configured to receive at least one row of rolling elements;
   two lateral rings and a plurality of crosspieces connecting the two lateral rings, such that the plurality of rolling element pockets are formed between the plurality of crosspieces; and
   at least one empty pocket, the at least one empty pocket having straight side walls extending from a radially inner side of the cage to a radially outer side of the cage, wherein the side walls are inclined at an angle relative to a radial axis of the cage, the radial axis extending from the center of the cage through the empty pocket,
   wherein the rolling bearing cage includes fewer rolling elements in the at least one row than the number of rolling element pockets, such that the at least one empty pocket does not receive a rolling element, and
   each wherein rolling element pocket of the plurality of rolling element pockets includes an undercut to secure the rolling element received within the rolling element pocket, the undercut being axially provided along a sidewall of the rolling element pocket.

2. A rolling bearing according to claim 1, wherein the at least one empty pocket has a different shape than the plurality of rolling element pockets.

3. A rolling bearing according to claim 2, wherein the at least one empty pocket is shaped so as to create a conveying or pumping action in at least one direction of rotation.

4. A rolling bearing according to claim 1, wherein the at least one empty pocket is designed to receive and/or distribute lubricant.

5. A rolling bearing according to claim 1, wherein the center line of the at least one empty pocket forms an angle with a radius extending from the longitudinal axis of the cage.

6. A rolling bearing according to claim 1, wherein the at least one empty pocket is designed without undercuts.

7. A rolling bearing according to claim 1, wherein the plurality of rolling element pockets are designed to receive bearing needles.

8. A method for producing a rolling bearing cage according to claim 1, wherein the plurality of rolling element pockets are pre-machined in a first step using a cylindrical milling cutter, and the at least one empty pocket is finish processed using the same or a different cylindrical milling cutter.

9. A method according to claim 8, wherein the undercuts in the plurality of rolling element pockets are produced with a profiled cutter.

10. A method according to claim 9, wherein the plurality of rolling pockets are radially produced using the cylindrical milling cutter, and the at least one empty pocket is produced with an offset using the same or a different cylindrical milling cutter.

11. A method according to claim 10, wherein the offset is provided by moving the cylindrical milling cutter or the rolling bearing cage crosswise with respect to the longitudinal axis of the cylindrical milling cutter.

* * * * *